United States Patent
Kovacs et al.

(10) Patent No.: US 7,215,958 B2
(45) Date of Patent: May 8, 2007

(54) RELOCATION METHOD, SYSTEM AND NETWORK ELEMENT

(75) Inventors: Andras Kovacs, Budapest (HU); Shavantha Kularatna, Irving, TX (US); Atte Länsisalmi, Espoo (FI); Gabriel Ramos, Malaga (ES); Syed Hossain, Lewisville, TX (US); Pekka Korja, Helsinki (FI); Raquel Sanchez, Malaga (ES); Sanna Mäenpää, Espoo (FI)

(73) Assignee: Nokia Corporation, Espoo (FI)

( * ) Notice: Subject to any disclaimer, the term of this patent is extended or adjusted under 35 U.S.C. 154(b) by 890 days.

(21) Appl. No.: 09/932,089

(22) Filed: Aug. 20, 2001

(65) Prior Publication Data

US 2003/0036387 A1 Feb. 20, 2003

(51) Int. Cl.
*H04Q 7/20* (2006.01)
(52) U.S. Cl. ............ 455/436; 455/438; 455/439; 370/331; 370/328
(58) Field of Classification Search .......... 455/436, 455/432.1, 432.2, 438, 439, 442, 435.2, 445, 455/423; 370/351, 328, 331
See application file for complete search history.

(56) References Cited

U.S. PATENT DOCUMENTS

| | | | |
|---|---|---|---|
| 6,131,030 A | | 10/2000 | Schon et al. |
| 6,721,566 B2 * | | 4/2004 | Longoni et al. ............. 455/436 |
| 6,725,039 B1 * | | 4/2004 | Parmar et al. ............... 455/436 |
| 6,738,625 B1 * | | 5/2004 | Oom et al. .................. 455/453 |
| 6,745,032 B1 * | | 6/2004 | Alvesalo et al. ............ 455/436 |
| 6,807,419 B1 * | | 10/2004 | Laiho et al. ................. 455/436 |
| 6,807,421 B1 * | | 10/2004 | Ahmavaara .................. 455/438 |
| 2002/0025815 A1 * | | 2/2002 | Rune et al. .................. 455/436 |
| 2002/0025820 A1 * | | 2/2002 | Fauconnier et al. ........ 455/452 |
| 2002/0082014 A1 * | | 6/2002 | Andersson et al. ......... 455/436 |
| 2002/0151304 A1 * | | 10/2002 | Hogan ......................... 455/436 |
| 2002/0168984 A1 * | | 11/2002 | Wallentin .................... 455/452 |
| 2004/0203714 A1 * | | 10/2004 | Van Lieshout et al. ..... 455/423 |

FOREIGN PATENT DOCUMENTS

EP 1079653 2/2001

* cited by examiner

*Primary Examiner*—Danh Cong Le
(74) *Attorney, Agent, or Firm*—Squire, Sanders & Dempsey, LLP (57) ABSTRACT

The present invention relates to a relocation method, system and network element for changing a serving radio resource control entity After an initial operating state in which a user equipment (30) has radio links with a serving network element (20) and a drift network element (21) supporting said serving network element (20) with a wireless connection, the serving network element (20) transmits a relocation-specific information to a target network element (22). Based on the relocation-specific information, the target network element (22) establishes a link to the drift network element (21), such that the drift network element (21) can receive user traffic from both the serving network element (20) and the target network element (20). Then, the radio resource control is relocated to the target network element (20). The relocation-specific information may comprise an identifier or a list of identifiers of drift network elements. Thus, existing soft handover techniques can be enhanced by allowing a user plane connection to be maintained with drift network elements. Thereby, any amount of drift network elements can be kept, with improved radio performance as a consequence.

49 Claims, 4 Drawing Sheets

RELOCATION METHOD, SYSTEM AND NETWORK ELEMENT

FIELD OF THE INVENTION

The present invention relates to a relocation method, system and network element for changing a serving radio resource control entity in a radio access network.

BACKGROUND OF THE INVENTION

As the Internet has grown in popularity and mobile Internet for text-based information and picture messaging is already a reality, the industry has turned its focus on engineering the most cost efficient network for more demanding multimedia services. IP-based networks are considered by many the best way forward and networking technology research and development is by and large centered around IP-technologies.

The development of an IP-based radio access network will bring together a number of radio access network technologies including second generation (2G), third generation (3G) and Wireless Local Area Networks (WLANs). Network operators are shifting from a circuit-switched to a packet-switched technology, while IP-based networks need to expand radio access rapidly, flexibly and cost efficiently.

IP-based radio access networks can be introduced as a smooth evolution from existing GSM (Global System for Mobile communications), EDGE (Enhanced Data Rates for GSM Evolution) and WCDMA (Wideband Code Division Multiple Access) networks, Key benefits of such IP-based radio access networks are distributed architecture with a separation of user and control planes (offering infinite scalability and no bottlenecks), integration of different radio interface technologies into a single radio access network, common radio resource management for optimum use of radio resources, quality of service (QoS) control, and network automation, open interfaces for multi-vendor networks, and compatibility to existing transmission networks.

In order to obtain the most efficient radio access network architecture, some functionality is suggested to be relocated between network elements. The IP-based radio access network (IP RAN) architecture introduces large radio access network gateways between the radio access network and the core Network. In IP RAN, the functions of UTRAN's Radio Network Controller (RNC) is distributed to other entities of the network. The macrodiversity combiners are no longer located in the RNCs. Meanwhile the macrodiversity combining is located in IP base transceiver stations (IP BTS) in the IP RAN. Also the radio resource control (RRC) is managed in the IP BTSs. In other words, some radio network controller functionality is located in the base transceiver stations to enable soft handover and associated signaling to happen along the shortest path, producing minimum delay and signaling load to those parts of the networks where this is not necessary.

However, current relocation scenarios are designed for radio resource control located in radio network controller (RNC) elements which supervise numerous base transceiver stations (BTSs). When RRC is moved down to the base transceiver station level, the relocation procedure will become much more frequent because the number of BTSs is much greater than the RNCs.

Hence, in order to maintain network performance, some limitations of the current relocation procedure must be removed. In particular, the current RNC-based soft handover, as defined in the 3GPP (Third Generation Partnership Project) specification TR 25.832 (Release '99), is allowed only when the radio link of the source RNC is removed. The relocation phase, which corresponds to a change of the instance for interconnection between a radio resource control network element and a core network or an access gateway of a radio access network, is only supported where all radio links are in a single Drift Radio Network Subsystem (DRNS) and where the Drift Radio Network Controller (DRNC) is the target RNC. In general, relocation procedures are the same for both cases involving the core network and involving the RAN access server.

Thus, multiple D-RNCs or D-BTSs can be established only after the relocation has taken place, and the radio performance cannot be optimized when RRC is moved down to a "lower" network level (e.g. BTS level),

SUMMARY OF THE INVENTION

It is therefore an object of the present invention to provide a relocation procedure by means of which radio performance can be improved.

This object is achieved by a relocation method for changing a serving radio resource control entity, said method comprising the steps of:

establishing a first operating state in which a user equipment has radio links with a serving network element in charge of radio resource control of said user equipment, and with a drift network element supporting said serving network element with a wireless connection to said user equipment;

transmitting a relocation-specific information from said serving network element to a target network element which is going to be the next serving radio resource control entity;

establishing based on said relocation-specific information a second operating state in which said user equipment has radio links with said drift network element and said target network element, and in which said drift network element supports said target network element with a user traffic connection to said user equipment and receives user traffic from both said serving network element and said target network element; and relocating said radio resource control to said target network element when said second operating state has been established, Furthermore, the above object is achieved by a relocation system for changing a serving radio resource control entity, said system comprising:

a serving network element for transmitting a relocation-specific information to a target network element which is going to be the next serving radio resource control entity, said serving network element being in charge of radio resource control of a user equipment; and a drift network element for supporting said serving network element with a wireless connection to said user equipment;

wherein said target network element is arranged to establish, in response to the receipt of said relocation-specific information, a link to said drift network element and to initiate a downlink bi-casting procedure to said serving network element and said target network element or a downlink transport forwarding procedure from said serving network element to said target network element; and wherein said system is arranged to change said radio resource control to said target network element after said initiation of said bi-casting or forwarding procedure.

Additionally, the above object is achieved by a radio network element for handling radio resource control in a radio access network, comprising:

means for receiving a relocation-specific information;
means for establishing, in response to the receipt of said relocation-specific information, a link to a drift network element specified by said relocation-specific information; and
means for initiating a downlink bi-casting procedure to said network element and a serving network element to be subjected to relocation, or a downlink transport forwarding procedure from said serving network element (20) to said network element.

In addition thereto, the above object is achieved by a network element for handling radio resource control in a radio access network, comprising:

means for adding an identification information to a relocation-specific information, said identification information identifying a drift network element supporting said network element in serving a user equipment; and
means for transmitting said relocation-specific information to a target network element to which radio resource control of said user equipment is to be relocated.

Accordingly, the proposed relocation scheme allows drift network elements to maintain their original radio links during relocation. When the relocation is completed to the target network element, a drift network element user plane switchover can be performed. Thereby, existing soft handover procedures can be enhanced with allowing user plane or user traffic connections to be maintained with drift network elements, to improve network performance.

Preferably, an Iur interface is preferably established between the drift network element and both the serving network element and the target network element.

According to an advantageous further development, the relocation-specific information may be transmitted in a relocation request message. The relocation request message may be e.g. a RANAP Relocation Required message transmitted to an access server of a core network. Alternatively, the relocation request message may be directly transmitted to said target network element. The relocation request message may comprise an identification of the target network element and the drift network element.

As an alternative, the relocation-specific information may comprise identifications of multiple drift network elements to which a connection is to be established by the target network element. In particular, the identification may comprise a list of drift network elements. This list may also include a list of temporary identifiers of the radio access network. Thus, any amount of drift network elements can be kept with improved radio performance as consequence.

The entity change may comprise a soft handover procedure.

According to another advantageous further development, said establishing step of said second operating state may comprise the steps of:

transmitting a drift setup message from said target network element to said drift network element;
initiating an uplink bi-casting procedure at said drift network element to said serving network element and said target network element;
initiating a downlink bi-casting procedure from a core network access point to said serving network element and said target network element, or a downlink transport forwarding procedure from said serving network element to said target network element; and
initiating a handover of said user equipment from said serving network element to said target network element.

According to still another advantageous further development, said relocation step may comprise the steps of:

instructing said drift network element to switchover its radio resource control interface from said serving network element to said target network element;
stopping bi-casting or forwarding to said serving network element after said switchover; and
releasing said radio resource control connection at said serving network element.

The radio access network may be a Universal Mobile Telecommunications System Terrestrial Radio Access Network (UTRAN) or an IP (Internet Protocol) radio access network.

Preferably, the serving network element, the drift network element and/or the target network element are base transceiver stations, base station controllers or radio network controllers, or a combination thereof.

BRIEF DESCRIPTION OF THE DRAWINGS

In the following, the present invention will be described in greater detail based on preferred embodiments with reference to the accompanying drawings In which.

DESCRIPTION OF THE PREFERRED EMBODIMENTS

The preferred embodiments will now be described on a basis of an IP radio access network architecture, where a user equipment 30, e.g. a mobile terminal or any other radio-connected terminal device, is connected via a serving IP-BTS 20 to a radio access network access point 10 of a core network. In the preferred embodiments, the radio access network access point is a Radio Access Network Access Server (RNAS). The RNAS may have separate gateway entities for circuit switched and packet switched (e.g. IP) core networks. However the scope of the invention is not limited to these embodiments and the invention may as well be carried out by connecting the IP BTS straight to the core network.

In the present IP radio access network, most functions of the centralized controllers (e.g. RNC and BSC) are moved to the base stations (IP-BTS). In particular, all the radio interface protocols are terminated in an IP-BTS. Entities outside the IP-BTSs are needed to perform common configuration and some radio resource functions, or interworking with legacy, gateways to the core network, and micro-mobility anchor points. Thus, an Iur-like interface is needed between the IP-BTSs, supporting both control plane signaling and user plane traffic. Full connectivity among the entities may be supported by an IPv6 (Internet Protocol Version 6) transport network. Each IP-BTS includes the layer 1 processing functionality and the processing of the radio protocols. It can be regarded as a small RNC/BSC connected with an Iu-like interface towards the RNAS 10, and with an Iur-like interface towards other IP-BTSs.

The RNAS 10 acts as an access point to the IP-based radio access network from the core network or other radio access networks.

Additionally, a RAN gateway (not shown) may be provided as an IP user plane access point from the core network or radio access networks to the IP-based radio access network, During the radio access bearer establishment procedure, the IP-based radio access network returns the core network transport addresses owned by the RAN gateway, where the user plane shall be terminated. Packet-switched and circuit-switched Iu interfaces are connected through the RAN gateway or gateways. The main function of the RAN gateway is the micro-mobility anchor, i.e. the U-plane switching during the BTS relocation/handover, in order to hide the mobility from the core network. Due to this function, it need not perform any radio network layer processing on the user data, but it relays data between the radio access network and the core network IP channels. In particular, it has a mapping function between receiving side tunnel endpoint identifiers (IDs) of corresponding interfaces. The RNAS 10 selects a RAN gateway when a radio access bearer is setup for a user.

The RNAS 10 may use more than one RAN gateway for the radio access bearer of one user equipment. The RNAS 10 selects and controls the RAN gateway during the connection setup and the relocation of an IP-BTS.

Figure 1:
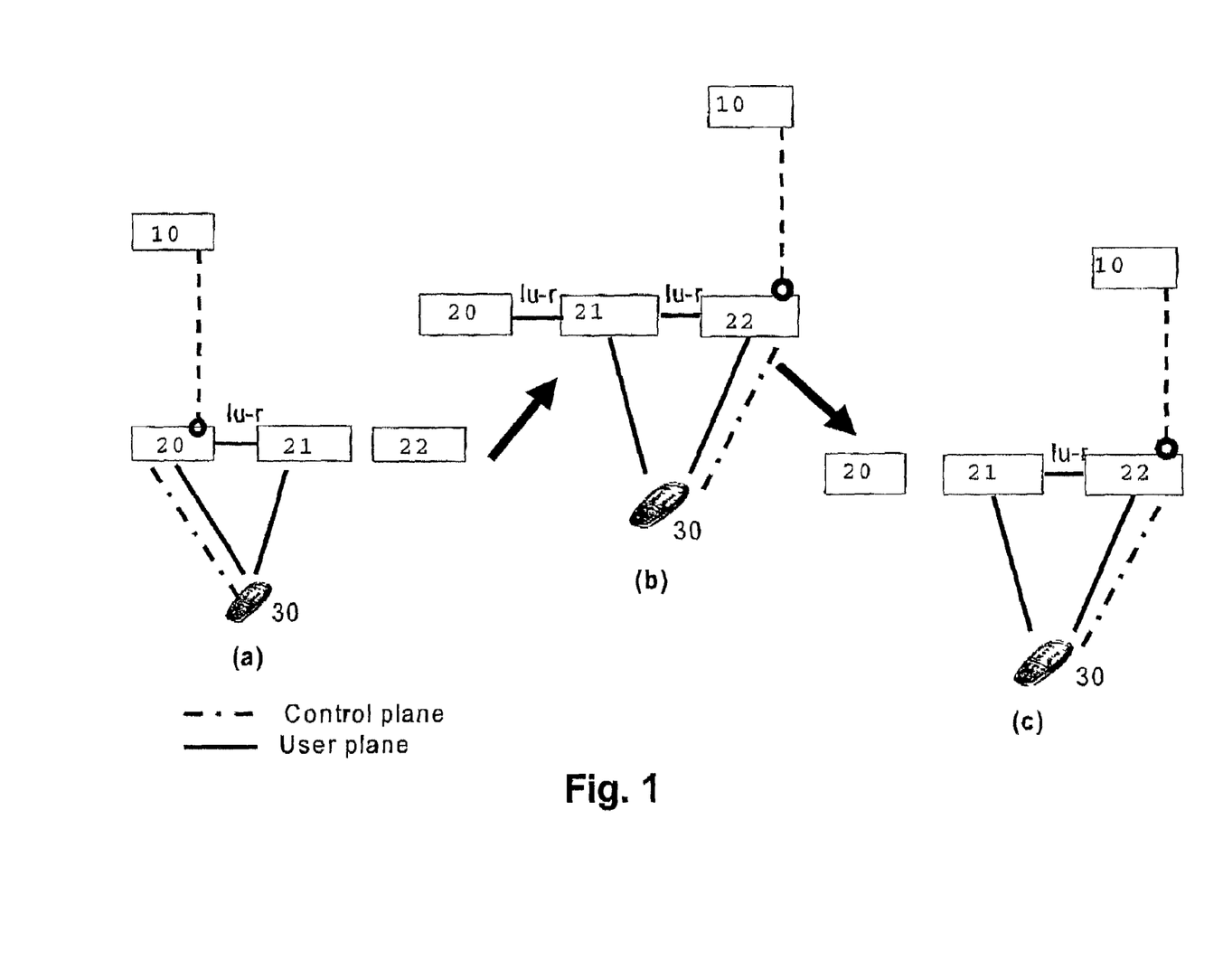
FIG. 1 shows three successive operation states of a radio access network during a relocation procedure according to a first preferred embodiment.

In particular, the network shown in FIG. 1 comprises a serving IP-BTS 20 which terminates the core network interface (indicated as a dotted line to the RNAS 10). This interconnection may be a Iu interface. Furthermore, a Iur interface is established between the serving IP-BTS 20 and a drift IP-BTS 21 which supports the serving IP-BTS 20 with a user traffic or user plane connection. Thus, the IP-BTS 21 provides only resources and radio L1 (layer 1) functions for the connection to the user equipment 30, while the core network or RNAS interface and the RRC termination are located in the serving IP-BTS 20.

Further the FIG. 1 shows a target IP-BTS 22, to which the core network interface or interconnection to the RNAS 10 is to be relocated based on a soft handover operation.

The left part (a) of FIG. 1 shows the initial operating state or radio link configuration before the relocation procedure according to the first preferred embodiment starts. As can be gathered from part (a) of FIG. 1, the serving IP-BTS 20 processes the control plane (dot-ash line) for radio resource control signaling for the mobile user equipment (UE) 30 and the user plane (solid line) for providing user traffic to the user equipment 30. In this operating state, the user equipment 30 has two radio links, one with the serving IP-BTS 20 and one with the drift IP-BTS 21. Hence, the serving IP-BTS 20 forwards the UE specific user plane or user traffic to the drift IP-BTS 21 via an established Iur interface which is a logical interface between two network elements in charge of controlling the use and integrity of the radio resources.

Based on mobile measurements and nodes of base transceiver stations, the serving IP-BTS 20 triggers a relocation procedure of the mobile user equipment 30. In particular, the serving IP-BTS 20 decides on the relocation target, which in the present case is the target IP-BTS 22. It should be noticed that the relocation process may be triggered also by other ways, for example it may be triggered by some other entity. Also the target cells of IP-BTSs may be given by some other entity.

In part (b) of FIG. 1, the serving IP-BTS 20 contacts the target IP-BTS 22 via the RNAS 10 and provides it with a relocation specific information. As an alternative, the serving IP-BTS 20 may contact the target IP-BTS 22 directly (in an optimized relocation case) to provide the relocation specific information, In this case, the relocation specific information may be passed from the serving IP-BTS 20 to a gate-way functionality and then to the target IP-BTS 22 via an inband signaling, The target IP-BTS 22 attempts to establish a new Iur connection with the drift IP-BTS 21. Upon completion of the new Iur connection, the user plane is bi-casted from the corresponding RAN gateway to both serving IP-BTS 20 and target IP-BTS 22. Additionally, the drift IP-BTS 21 initiates an uplink bi-casting to the serving IP-BTS 20 and the target IP-BTS 22. Then, the serving IP-BTS 20 is relocated by the RNAS 10 to the target IP-BTS 22. As shown in part (b) of FIG. 1, the new radio links to the user equipment 30 are established between the drift IP-BTS 21 and the target IP-BTS 22 which is now the new serving IP-BTS having a radio resource control plane to the user equipment 30. The old radio link from the former serving IP-BTS 20 is removed. Now, the drift IP-BTS 21 receives user equipment specific user traffic from both the former serving IP-BTS 20 as well as the target IP-BTS 22 (new serving IP-BTS). In this situation, the drift IP-BTS 21 discards the user plane or user traffic received from the former serving IP-BTS 20.

In the right part (c) of FIG. 1 a final relocation operation state is shown in which the serving IP-BTS relocation is completed. The new serving IP-BTS 22 indicates to the drift IP-BTS 21 to switchover the Iur interface or link to the connection between the new serving IP-BTS 22 and the drift IP-BTS 21. After the switchover to the new Iur link, the old Iur link between the former serving IP-BTS 20 and the drift IP-BTS 21 is released.

Thus, during the relocation procedure, a user plane connection is provided between the drift IP-BTS and both serving IP-BTS and target IP-BTS.

An alternative procedure, the old Iur link may be released first and than a request may be issued to switchover to the new Iur link. However, in this case, the user equipment 30 would experience a brief interruption of the soft handover radio link between the user equipment 30 and the drift IP-BTS 21 due to the release of the old Iur link.

Figure 2:
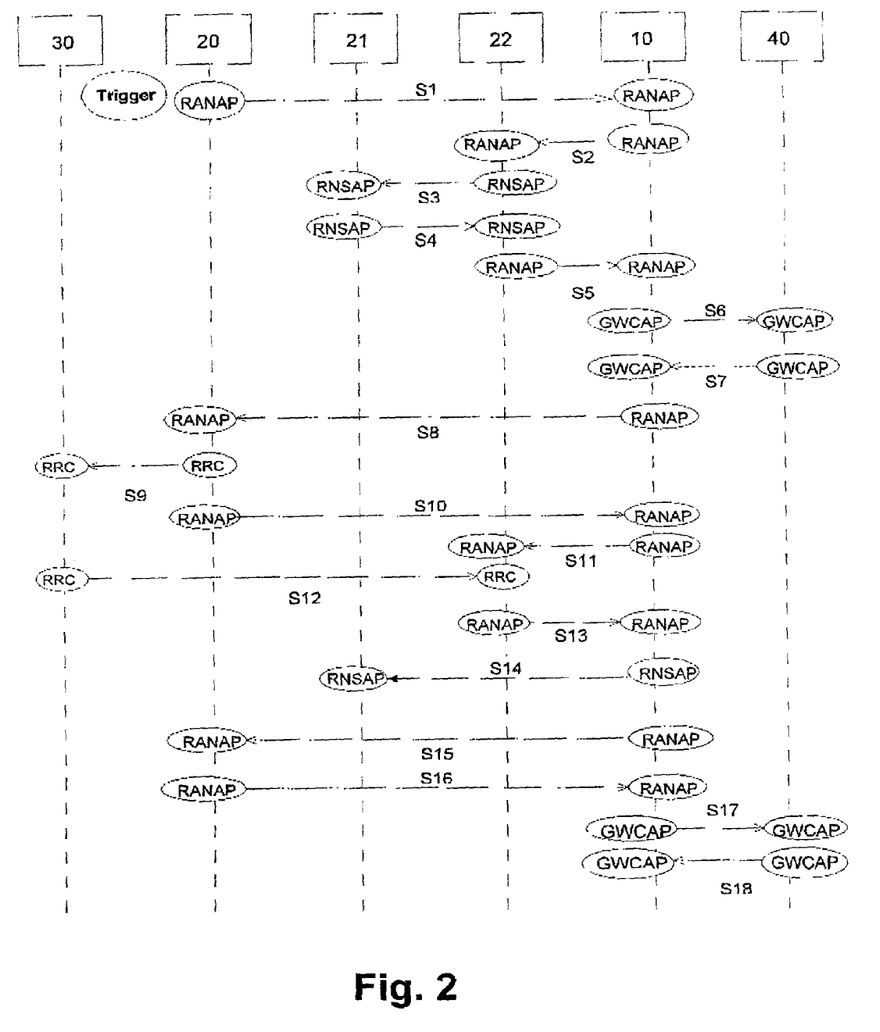
FIG. 2 shows a signaling diagram corresponding to the relocation procedure of FIG. 1.

FIG. 2 shows a signaling diagram indicating the transmission of signaling messages between the network elements of the IP-based radio access network, wherein the RAN gateway is denoted by reference number 40.

When a relocation is triggered e.g. based on mobile measurements and/or load situations, the serving IP-BTS 20 initiates in step S1 a relocation procedure by sending a RANAP (RAN Application Part) Relocation Required message to the RNAS 10. The RANAP is an application part responsible for radio network signaling over the Iu interface. The RANAP Relocation Required message may consist of a relocation type, a cause, a source ID, a target ID and the Source to Target Transparent container, which is an information field of this message. Furthermore. this message includes an identification of the drift IP-BTS 21. In particular, this identification may be a D-RNTI (Drift Radio Network Temporary Identifier), which is an identifier for a user equipment when an RRC connection exists, Then, in step S2, the RNAS 10 determines from the target ID, the D-RNTI and the Source to Target container that the concerned relocation is an intra-RNAS relocation, and sends the Relocation Request message to the target IP-BTS 22. For each radio access bearer that needs to be setup, the RNAS 10 provides a radio access bearer ID, radio access bearer parameters, and transport layer information to the new target IP-BTS 22. In general, a bearer is an information transmission part of defined capacity, delay, bit error rate, etc. The radio access bearer defines a service that the access stratum provides to the non-access stratum for transfer of user data between the user equipment 30 and the core network.

Upon receiving the relocation request message, the target IP-BTS 22 sends a drift BTS setup message to the drift IP-BTS 21 using a RNSAP (Radio Network Subsystem Application Part) signaling which is a radio network signaling used over the Iur interface (step S3). The drift setup message includes a transaction ID, an identification of the target IP-BTS 22 and the identification of the drift IP-BTS 21. These identifications may be RNTIs. In step S4, the drift IP-BTS 21 responds with a RNSAP drift BTS response message including the transport address of the drift IP-BTS 21 and its identification (e.g. D-RNTI).

Upon receiving the acknowledgement via a Simple Control Transmission Protocol (SCTP), the drift IP-BTS 21 can initiate an uplink bi-casting procedure to the serving IP-BTS 20 and the target IP-BTS 22, In step S5, the target IP-BTS 22 responds to the RNAS 10 with a Relocation Request Acknowledge message that includes the target to source transparent container including radio related information which the user equipment 30 needs for the handover procedure. The RNAS 10 initiates a downlink bi-casting procedure to the serving IP-BTS 21 and the target IP-BTS 22 by issuing and receiving a corresponding signaling to/from the RAN gateway 40 using a corresponding gateway control signaling (steps S6 and S7), As an alternative, the serving IP-BTS 20 may perform a downlink transport forwarding where downlink packet data units (PDUs) are duplicated and one copy is forwarded to the target IP-BTS 22.

Upon configuring the RAN gateway 40, the RNAS 10 sends a RANAP Relocation Command message to the serving IP-BTS 20 in step S8. The RNAS 10 provides to the serving IP-BTS 20 an information about the radio access bearers to be released and the radio access bearers subject to data forwarding. Then, in step S9, the serving IP-BTS 20 sends an Active Set Update message to the user equipment 30 using a radio resource control (RRC) signaling (step 9). This message may include the new radio link to be added and the old radio link to be removed.

In steps S10 and S11, the serving IP-BTS 20 forwards the radio access bearer contexts to the target IP-BTS 22 via the RNAS 10 using the RANAP signaling. It is noted, that these steps S10 and S11 are only required for lossless radio access bearers.

In step S12, the target IP-BTS 22 receives an Active Set Update Complete message from the user equipment 30 using an RRC signaling. Upon receiving the Active Set Update Complete message, the target IP-BTS 22 sends a RANAP Relocation Complete message to the RNAS 10 (step S13). In this situation, the user plane is still maintained to the Iur interface between the serving IP-BTS 20 and the drift-BTS 21.

In step S14, the RNAS 10 instructs the drift IP-BTS 21 to switchover the Iur link from the old serving IP-BTS 20 to the new target IP-BTS 22 using the RNSAP signaling. Then, in step S15, the RNAS 10 initiates an Iu release procedure to the old serving IP-BTS 20 using the RANAP signaling. The old serving IP-BTS 20 sends an Iu release complete message to the RNAS 10 (step S16).

Figure 3:
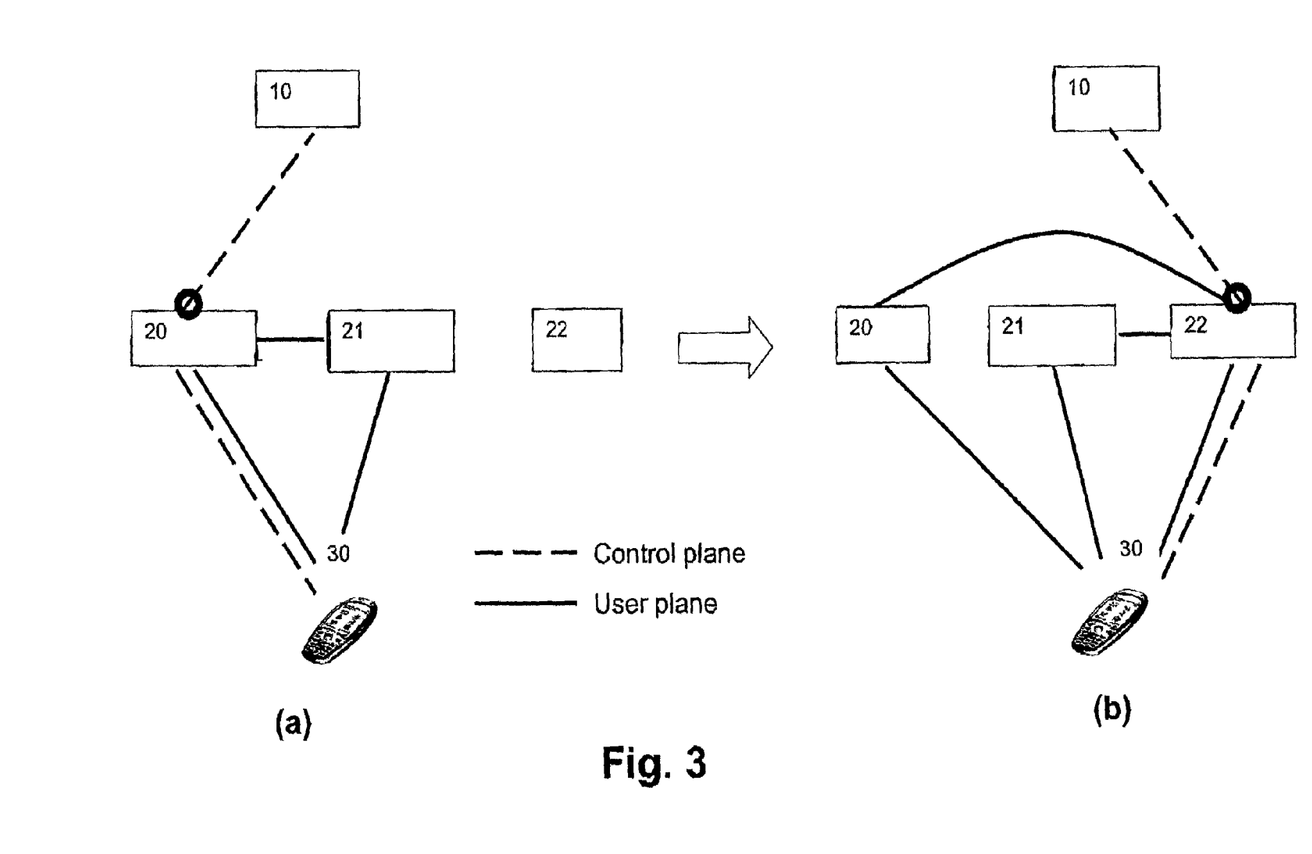
FIG. 3 shows two successive operation states of a relocation procedure according to a second preferred embodiment.

Finally, in steps S17 and S18, the RNAS 10 initiates stopping of the bi-casting to the old serving IP-BTS 20 based on a corresponding gateway control signaling to the RAN gateway 40. It is noted that the Iu release and the bi-casting removal may be performed simultaneously, FIG. 3 shows two successive operation states of a relocation procedure according to a second preferred embodiment in which multiple drift network elements, e.g. IP-BTSs, are allowed to be kept during the relocation procedure. In particular, any amount of drift IP-BTSs can be kept with improved radio performance as a consequence.

The radio link configuration according to the initial operating state (a) in FIG. 3 corresponds to the operation state (a) of FIG. 1, Therefore, a corresponding description is omitted for reasons of simplicity. It is further noted that the network elements shown in FIG. 3 fully correspond to the network elements of FIG. 1. Therefore, a description of these network elements is also omitted here.

In the radio link configuration according to the operation state (b) of FIG. 3, the serving IP-BTS 20 contacts the target IP-BTS 22 via the RNAS 10 or directly (in an optimized relocation case) and provides it with a relocation-specific information containing a list of current drift IP-BTSs and a proposed list of drift IP-BTSs. In the present case, the drift IP-BTS 21 is indicated in the current list and the serving IP-BTS and the drift IP-BTS 21 are indicated in the proposed list. Based on the proposed drift IP-BTS list, the target IP-BTS 22 establishes Iur links to all the proposed drift IP-BTSs. The current list is used by the target IP-BTS 22 to initiate the switchover to the new Iur link after relocation. This new scheme overcomes the restriction of the initially described conventional radio access networks which allow the use of only one drift network element identification (e.g. D-RNTI).

During the relocation initiation, the serving IP-BTS 20 can provide the proposed list in an information element (e.g. Source to Target Transparent container) of the Relocation Required RANAP signaling to the target IP-BTS 22. A similar operation can be performed in conventional systems between a serving RNC and a target RNC so as to provide a link to multiple DRNCs, As indicated by the solid lines in part (b) of FIG. 3, user traffic connections or links are provided from the target IP-BTS 22 to both the old serving IP-BTS 20 (which is now a drift IP-BTS) and the drift IP-BTS 21. Furthermore, user traffic radio links are provided from all IP-BTSs 20 to 22 to the user equipment 30, while the control plane (indicated as a dotted line) has been switched from the old serving IP-BTS 20 to the new target IP-BTS 22.

Figure 4:
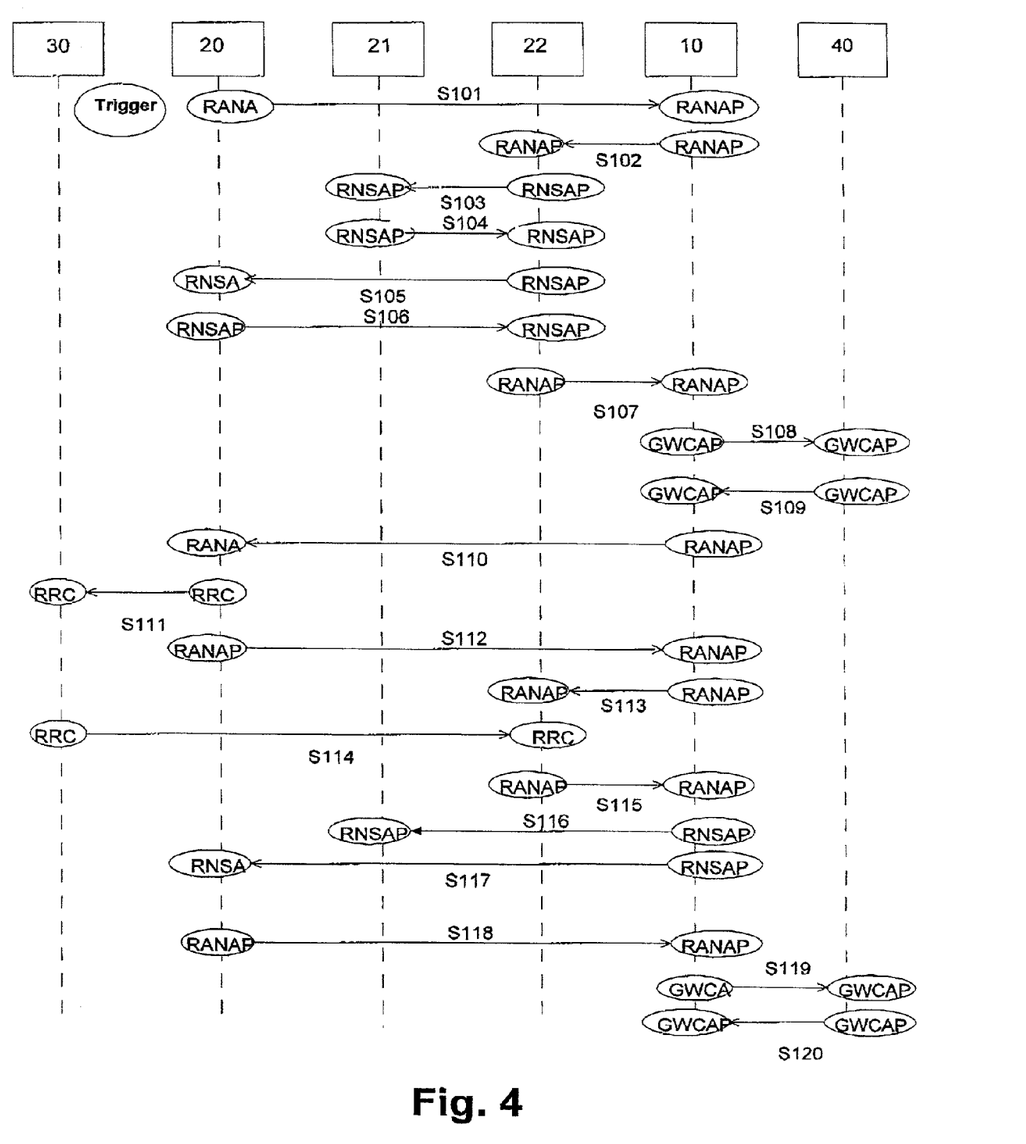
FIG. 4 shows a signaling diagram of the relocation procedure of FIG. 3.

FIG. 4 shows a signaling diagram relating to the relocation procedure of FIG. 3. It is noted that the initial steps S101 to S104 basically correspond to the initial steps S1 to S4 of FIG. 2. Contrary to step S1 of FIG. 2, the RANAP Relocation Required message according to step S101 includes the above mentioned list of identifiers of proposed IP-BTSs (D-RNTI list) which in the present case consists of the identifiers of the drift IP-BTS 21 and the serving IP-BTS 20.

In steps S105 and S106, the RNSAP signaling is used by the target IP-BTS 22 to send a drift BTS setup message also to the old serving IP-BTS 20 due to its new drift role. This message includes the corresponding temporary identifier (U-RNTI). In step S106, a corresponding drift BTS setup response is transmitted from the serving IP-BTS 20 to the target IP-BTS 22. Then, in step S107, the target IP-BTS 21 responds to the RNAS 10 with the Target to Source Transparent container which contains radio-related information which the user equipment 30 needs for handover.

The following steps S108 to S116 correspond to the steps S6 to S14 of FIG. 2.

In step S1 17, the RNAS 10 initiates a Iu release procedure to the old serving IP-BTS 20 and also instructs the switchover of the Iur link from the drift IP-BTS 21 to the target IP-BTS 22.

The remaining steps S118 to S120 correspond to the steps S16 to S18 of FIG. 2.

Thus, according to the second preferred embodiment, a list of drift network element identifiers can be transmitted from the original serving IP-BTS 20 to the target IP-BTS 22 to thereby initiate a setup procedure to multiple drift IP-BTSs.

It is noted that the present invention can be implemented in any radio access network and is not restricted to the specific elements of the IP-based radio access network according to the preferred embodiments. The names of various functional entities, such as the RNC, BSC and the BTS, may be different in different cellular networks. The names used in the context of the preferred embodiments are not intended to limit or restrict the invention. In general any logical interface between two network elements in charge of controlling the use and integrity of radio resources can be used instead of the described Iur interface. Moreover, any interconnection between a network element in charge of controlling the use and integrity of the radio resources and a core network can be used instead of the Iu interface. The described drift network element may be any network element supporting a serving network element with radio resources when the connection between the radio access network and the user equipment need to use cells controlled by this network element. The serving network element may be any network element terminating the core network interface and being in charge of radio resource control connection between a user equipment and the radio access network. The RNAS 10 may be replaced by any entity which is a signaling gateway towards the core network, In other words, it is the access point from core network to radio access network, RNAS may even be replaced by the core network as such in future implementations.

Thus, the present invention can be applied in any radio access network environment where a drift network element and a relocation functionality between serving network elements is provided. The preferred embodiments may thus vary within the scope of the attached claims.

The invention claimed is:

1. A relocation method, comprising:
    establishing a first operating state in which a user equipment has radio links with a serving network element in charge of radio resource control of said user equipment and with a drift network element supporting said serving network element with a wireless connection to said user equipment;
    transmitting a relocation-specific information from said serving network element to a target network element that is going to be the next serving radio resource control entity;
    establishing, based on said relocation-specific information, a second operating state in which said user equipment has radio links with said drift network element and said target network element, and in which said drift network element supports said target network element with a user traffic connection to said user equipment and receives user traffic from both said serving network element and said target network element; and
    relocating said radio resource control to said target network element when said second operating state has been established.

2. The method according to claim 1, further comprising:
    establishing an Iur interface between said drift network element and both said serving network element and said target network element.

3. The method according to claim 2, wherein the transmitting said relocation-specific information comprises transmitting the relocation-specific information in a relocation request message.

4. The method according to claim 2, wherein said relocating comprises a soft handover procedure.

5. The method according to claim 2, wherein said establishing of said second operating state comprises
    transmitting a drift setup message from said target network element to said drift network element,
    initiating an uplink bi-casting procedure at said drift network element to said serving network element and said target network element,
    initiating a downlink bi-casting procedure from a core network access point to said serving network element and said target network element, or a downlink transport forwarding procedure from said serving network element to said target network element, and
    initiating a handover of said user equipment from said serving network element to said target network element.

6. The method according to claim 2, wherein said relocating comprises
    instructing said drift network element to switch over its radio resource control interface from said serving network element to said target network element,
    stopping bi-casting or forwarding to said serving network element after said switch over, and
    releasing said radio resource control connection at said serving network element.

7. The method according to claim 1, wherein the transmitting said relocation-specific information comprises transmitting the relocation-specific information in a relocation request message.

8. The method according to claim 7, wherein said relocating comprises a soft handover procedure.

9. The method according to claim 7, wherein said establishing of said second operating state comprises
    transmitting a drift setup message from said target network element to said drift network element,
    initiating an uplink bi-casting procedure at said drift network element to said serving network element and said target network element,
    initiating a downlink bi-casting procedure from a core network access point to said serving network element and said target network element, or a downlink transport forwarding procedure from said serving network element to said target network element, and
    initiating a handover of said user equipment from said serving network element to said target network element.

10. The method according to claim 7, wherein said relocating comprises
    instructing said drift network element to switch over its radio resource control interface from said serving network element to said target network element,
    stopping bi-casting or forwarding to said serving network element after said switch over, and
    releasing said radio resource control connection at said serving network element.

11. The method according to claim 7, wherein the transmitting said relocation request message comprises transmitting a radio access network application part relocation request message to an access server or point of a core network.

12. The method according to claim 11, wherein the transmitting said relocation specific information comprises transmitting identifications of multiple drift network elements to which a connection is to be established by said target network element.

13. The method according to claim 12, wherein the transmitting said identification comprises transmitting a list of temporary identifiers of said radio access network.

14. The method according to claim 11, wherein the transmitting said relocation request message comprises transmitting an identification of said target network element and said drift network element.

15. The method according to claim 11, wherein said relocating comprises a soft handover procedure.

16. The method according to claim 11, wherein said establishing of said second operating state comprises
transmitting a drift setup message from said target network element to said drift network element,
initiating an uplink bi-casting procedure at said drift network element to said serving network element and said target network element,
initiating a downlink bi-casting procedure from a core network access point to said serving network element and said target network element, or a downlink transport forwarding procedure from said serving network element to said target network element, and
initiating a handover of said user equipment from said serving network element to said target network element.

17. The method according to claim 11, wherein said relocating comprises
instructing said drift network element to switch over its radio resource control interface from said serving network element to said target network element,
stopping bi-casting or forwarding to said serving network element after said switch over, and
releasing said radio resource control connection at said serving network element.

18. The method according to claim 7, wherein the transmitting said relocation request message comprises directly transmitting the relocation request message to said target network element.

19. The method according to claim 18, wherein the transmitting said relocation request message comprises transmitting an identification of said target network element and said drift network element.

20. The method according to claim 18, wherein said relocating comprises a soft handover procedure.

21. The method according to claim 18, wherein said establishing of said second operating state comprises
transmitting a drift setup message from said target network element to said drift network element,
initiating an uplink bi-casting procedure at said drift network element to said serving network element and said target network element,
initiating a downlink bi-casting procedure from a core network access point to said serving network element and said target network element, or a downlink transport forwarding procedure from said serving network element to said target network element, and
initiating a handover of said user equipment from said serving network element to said target network element.

22. The method according to claim 18, wherein said relocating comprises
instructing said drift network element to switch over its radio resource control interface from said serving network element to said target network element,
stopping bi-casting or forwarding to said serving network element after said switch over, and
releasing said radio resource control connection at said serving network element.

23. The method according to claim 18, wherein the transmitting said relocation specific information comprises transmitting identifications of multiple drift network elements to which a connection is to be established by said target network element.

24. The method according to claim 7, further comprising:
including an identification of said target network element and said drift network element in said relocation request message.

25. The method according to claim 24, wherein said relocating comprises a soft handover procedure.

26. The method according to claim 24, wherein said relocating comprises
instructing said drift network element to switch over its radio resource control interface from said serving network element to said target network element,
stopping bi-casting or forwarding to said serving network element after said switch over, and
releasing said radio resource control connection at said serving network element.

27. The method according to claim 24, wherein said establishing of said second operating state comprises
transmitting a drift setup message from said target network element to said drift network element,
initiating an uplink bi-casting procedure at said drift network element to said serving network element and said target network element,
initiating a downlink bi-casting procedure from a core network access point to said serving network element and said target network element, or a downlink transport forwarding procedure from said serving network element to said target network element, and
initiating a handover of said user equipment from said serving network element to said target network element.

28. The method according to claim 24, wherein the transmitting said relocation specific information comprises transmitting identifications of multiple drift network elements to which a connection is to be established by said target network element.

29. The method according to claim 1, wherein the relocating comprises a soft handover procedure.

30. The method according to claim 29, wherein said establishing of said second operating state comprises
transmitting a drift setup message from said target network element to said drift network element,
initiating an uplink bi-casting procedure at said drift network element to said serving network element and said target network element,
initiating a downlink bi-casting procedure from a core network access point to said serving network element and said target network element, or a downlink transport forwarding procedure from said serving network element to said target network element, and initiating a handover of said user equipment from said serving network element to said target network element.

31. The method according to claim 29, wherein said relocating comprises
instructing said drift network element to switch over its radio resource control interface from said serving network element to said target network element,
stopping bi-casting or forwarding to said serving network element after said switch over, and
releasing said radio resource control connection at said serving network element.

32. The method according to claim 1, wherein said establishing of said second operating state comprises
transmitting a drift setup message from said target network element to said drift network element,
initiating an uplink bi-casting procedure at said drift network element to said serving network element and said target network element,
initiating a downlink bi-casting procedure from a core network access point to said serving network element and said target network element, or a downlink transport forwarding procedure from said serving network element to said target network element, and
initiating a handover of said user equipment from said serving network element to said target network element.

33. The method according to claim 32, wherein said relocating comprises
instructing said drift network element to switch over its radio resource control interface from said serving network element to said target network element,
stopping bi-casting or forwarding to said serving network element after said switch over, and
releasing said radio resource control connection at said serving network element.

34. The method according to claim 1, wherein said relocating comprises
instructing said drift network element to switch over its radio resource control interface from said serving network element to said target network element,
stopping bi-casting or forwarding to said serving network element after said switch over, and
releasing said radio resource control connection at said serving network element.

35. A relocation system, comprising:
a serving network element configured to transmit a relocation-specific information to a target network element that is going to be the next serving radio resource control entity, said serving network element configured to be in charge of radio resource control of a user equipment; and
a drift network element configured to support said serving network element with a wireless connection to said user equipment,
wherein said target network element is configured to establish, in response to the receipt of said relocation-specific information, a link to said drift network element and to initiate a downlink bi-casting procedure to said serving network element and said target network element or a downlink transport forwarding procedure from said serving network element to said target network element, and
wherein said system is configured to change said radio resource control to said target network element after said initiation of said bi-casting or forwarding procedure.

36. The system according to claim 35, wherein said system is provided in a universal mobile telecommunications terrestrial radio access network or an internet protocol radio access network.

37. The system according to claim 35, wherein said serving network element, said drift network element, and/or said target network element are base transceiver stations, base station controllers, radio network controllers, or a combination thereof.

38. The system according to claim 17, wherein said link to said drift network element comprises an Iur interface.

39. The system according to claim 36, wherein said serving network element, said drift network elements, and/or said target network element are base transceiver stations, base station controllers, or radio network controllers, or a combination thereof.

40. The system according to claim 36, wherein said link to said drift network element comprises an Iur interface.

41. The system according to claim 35, wherein said link to said drift network element comprises an Iur interface.

42. The system according to claim 35, wherein said target network element is configured to establish links to multiple drift network elements based on an identification in said relocation-specific information.

43. A network element, comprising:
a receiver unit configured to receive a relocation-specific information;
an establishment unit configured to establish, in response to the receipt of said relocation-specific information, a link to a drift network element specified by said relocation-specific information; and
an initiation unit configured to initiate a downlink bi-casting procedure to said network element and to a serving network element to be subjected to relocation, or a downlink transport forwarding procedure from said serving network element to said network element,
wherein said network element is configured to handle radio resource control in a radio access network.

44. The network element according to claim 43, wherein said network element is a base transceiver station, a base station controllers, or a radio network controller.

45. A network element, comprising:
an addition unit configured to add an identification information to a relocation-specific information, said identification information configured to identify a drift network element supporting said network element in serving a user equipment; and
a transmission unit configured to transmit said relocation-specific information to a target network element to which radio resource control of said user equipment is to be relocated,
wherein said network element is configured to handle radio resource control in a radio access network.

46. The network element according to claim 45, wherein said network element is a base transceiver station, a base station controllers or a radio network controller.

47. A relocation system, comprising:
a serving means for transmitting a relocation-specific information to a target means that is going to be the next serving radio resource control entity, and for being in charge of radio resource control of a user equipment; and
a drift means for supporting said serving means with a wireless connection to said user equipment;

wherein said target means is configured to establish, in response to the receipt of said relocation-specific information, a link to said drift means and to initiate a downlink bi-casting procedure to said serving means and said target means or a downlink transport forwarding procedure from said serving means to said target means; and wherein said system is configured to change said radio resource control to said target means after said initiation of said bi-casting or forwarding procedure.

48. A network element, comprising:

means for receiving a relocation-specific information;

means for establishing, in response to the receipt of said relocation-specific information, a link to a drift network element specified by said relocation-specific information; and means for initiating a downlink bi-casting procedure to said network element and to a serving network element to be subjected to relocation, or a downlink transport forwarding procedure from said serving network element to said network element, wherein said network element is configured to handle radio resource control in a radio access network.

49. A network element, comprising:

means for adding an identification information to a relocation-specific information, said identification information configured to identify a drift network element supporting said network element in serving a user equipment; and means for transmitting said relocation-specific information to a target network element to which radio resource control of said user equipment is to be relocated, wherein said network element is configured to handle radio resource control in a radio access network.

* * * * *